Patented Jan. 27, 1925.

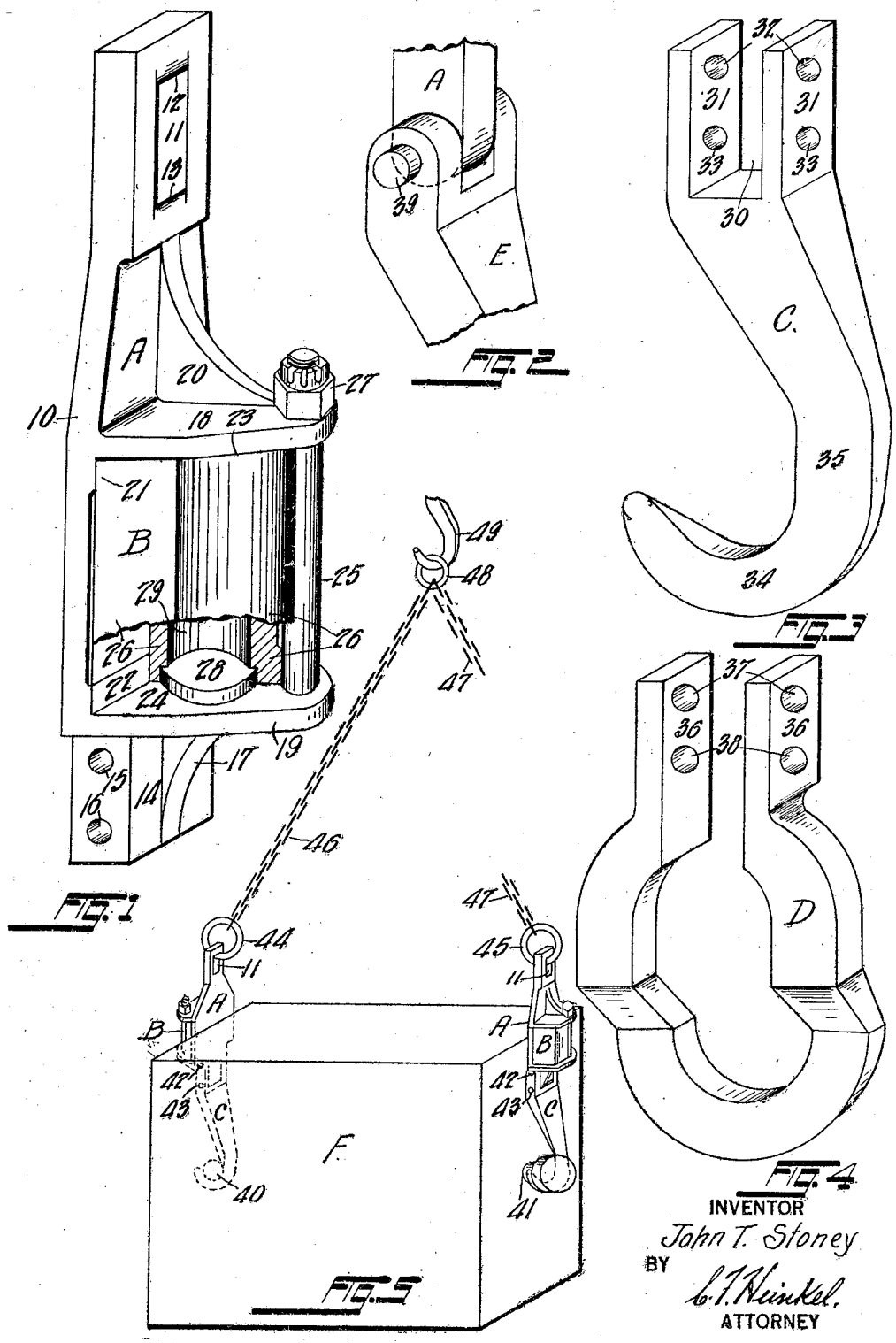

1,524,060

UNITED STATES PATENT OFFICE.

JOHN T. STONEY, OF LAKEWOOD, OHIO.

HOOK MECHANISM.

Application filed February 26, 1923. Serial No. 621,360.

*To all whom it may concern:*

Be it known that I, JOHN T. STONEY, a citizen of the United States, and a resident of Lakewood, county of Cuyahoga, and State of Ohio, have invented a new and useful Improvement in Hook Mechanisms, of which the following is a specification.

My invention relates to hook mechanisms such as are used on cranes and similar devices to take hold of objects.

The main object of my invention is to provide a hook mechanism which can readily be made adaptable to take hold of various objects, or to be readily adaptable to different cranes or hoisting devices, or to be readily assembled to form a hook with a bar as a bale or with chains or other structure, flexible or otherwise, and the trunk portion of which may carry a vibrator or other vibrator mechanism. Other objects will become apparent during the description of the mechanisms shown in the drawing.

I attain my objects by the mechanisms illustrated in the accompanying drawing in which Fig. 1 is a perspective view of the main body or trunk of a leg for a hook mechanism; Fig. 2 is a modification of a joint between the trunk and a hook-end; Fig. 3 is a perspective view of a hook-end with an open eye; Fig. 4 is a perspective view of a hook-end with a closed eye; Fig. 5 is a perspective view showing the trunk of Fig. 1 and the hook-end of Fig. 3 assembled and applied to the trunnions of a foundry flask and connected to a crane-hook by chains.

Similar reference characters refer to similar parts throughout the views.

As contemplated, the trunks and the hook-ends for the legs of a hook mechanism are made in separate parts and two or more of such legs may be joined by chains or bar or otherwise to form a complete hook mechanism.

The trunk A, Fig. 1, has the wall 10, extended in thickness at the top where it is provided with the slot 11 which has the edges 12 and 13 rounded to better adapt the trunk for connection to a bar or chain-ring or other means and to permit this trunk some movement on such means to adjust itself to varying conditions usually found in hook mechanisms. At the lower end, the trunk A has the ear 14 provided with the holes 15 and 16 and the stiffening rib 17.

Intermediate the ends, the trunk A has the shelves 18 and 19 projecting from the wall 10 and stiffened by the ribs 20 and 17 respectively. The abutment faces 21 and 22 are provided at the inner end of the inner faces 23 and 24 of the shelves for the purpose appearing presently.

A percussion apparatus B, in the present instance a fluid pressure actuated vibrator, is disposed between the shelves 18 and 19 and the faces 23 and 24 of these shelves abut on the ends of the vibrators B and are held thereon endwise by the bolts 25.

In the present instance, the body 26 of the vibrator B abuts the faces 21 and 22 sidewise and partially surrounds and fits closely, both sidewise and crosswise, to the bolt 25 so that the vibrator is held in position lengthwise and sidewise and crosswise by the bolt 25, and can readily be removed for the purpose of inspection or repairs or otherwise by merely removing the bolt 25.

Longitudinal play of the vibrator B, due to wear or other causes, can readily be taken up by manipulation of the nut 27.

The vibrator B shown here has a percussion head 28 countersunk into each end of the bore 29 of the body 26, and these heads 28 rest on the faces 23 and 24 respectively as shown sectionally on the face 24 only (Fig. 1) face 23 being a duplicate.

A plunger, not shown in the drawing, operates in the bore 29 as is usual in such vibrators and strikes against one of the heads 28 at each end of its stroke and thereby creates vibrations in the material of the hook as set forth in my pending applications for "method and apparatus for shaking out foundry flasks and the like," filed Sept. 12, 1921, Serial No. 500,193, and for "vibrator hook," filed Sept. 12, 1921, Serial No. 500,194.

It is noted that, in the present instance, the heads 28 are flat discs and have no shoulders thereon and are therefore substantially free from crystallization tendencies.

The hook-end C, Fig. 3, is provided at the upper end, with the slot 30 adapted to the ear 14 on the trunk A and the ears 31 are provided with the holes 32 and 33 adapted to the holes 15 and 16 respectively.

The power portion of the hook-end C is formed into the hook-eye 34 and the portion 35 thereof is offset so that the center of the hook-eye 34 is located substantially on a vertical axis passing through the center of the slot 30 to prevent "side pull" of the hook. It is noted that this hook-end is open on one side and that the throat thereof is very wide so that an overhead crane operator can manipulate the hook mechanism without much assistance.

The hook-end D, Fig. 4, has, at its upper end, the ears 36 adapted to the ear 14 on the trunk A and is provided with the holes 37 and 38 adapted to the holes 15 and 16 respectively.

The lower portion of the hook-end D is formed as a closed hook-eye or loop and the bottom thereof is offset to form a better engagement for such objects as trunnions on foundry flasks.

Fig. 2 shows a swivel joint connection between the trunk A and the hook-end E, hinged to each other by the pin 39 as distinguished from the two hole connections previously described; although the pin 39 may conveniently pass through either of the holes 15 and 16.

Fig. 5 shows a foundry flask F with the trunnions 40 and 41 and the hook-ends C engaging these trunnions.

These hook-ends C are here secured to the trunk A by the pins 42 and 43.

The vibrators B are here mounted in their respective places in the trunks A and the rings 44 and 45 are inserted into the slots 11. One end of the chains 46 and 47 is secured to the rings 44 and 45 respectively while the other ends thereof are secured to the ring 48 which can, conveniently, be attached to a crane-hook 49.

With this chain arrangement as the upper structure, a hook mechanism can readily take hold of flasks or other objects of different lengths without specific adjustment; and with the removable hook-ends a hook mechanism can readily be made adaptable to take hold of different objects, or to take hold of them in a different manner and without replacing the vibrator for each change.

This arrangement of separate trunk and hook-ends can also be applied to legs connected by a bar as the upper structure as shown in my former application previously mentioned.

Other modifications may be made, within the scope of the appended claims, therefore, without limiting myself to the precise construction and arrangement of elements and application of elements shown and described, I claim:—

1. A hook mechanism of the character described having legs, each comprising a trunk provided with means for engaging a hook-end at one end thereof and with means for engaging the upper structure of said hook at the other end thereof and with a vibrator intermediate said ends.

2. A hook mechanism of the character described comprising, an upper structure, a pair of legs each composed of a trunk adapted to be attached to said upper structure, and a removable hook-end attached to said trunk, and a vibrator secured to said trunk.

3. A leg for a hook mechanism of the character described including, a trunk, a removable hook-end on said trunk, and a vibrator secured to said trunk.

4. A leg for a hook mechanism of the character described including, a trunk provided with shelves, a vibrator between said shelves, and a bolt through both of said shelves.

5. A leg for a hook mechanism of the character described including, a trunk provided with shelves, a vibrator between said shelves, and a bolt through both of said shelves and adapted to clamp the same to said vibrator endwise and to retain said vibrator in position sidewise.

6. A leg for a hook mechanism of the character described including, a trunk provided with shelves, a vibrator between said shelves, and a bolt through both of said shelves and adapted to clamp the same to said vibrator endwise and contacting said vibrator to retain the same in position sidewise and crosswise.

7. A leg for a hook mechanism of the character described including, a trunk provided with shelves, abutment faces intermediate said shelves, a vibrator between said shelves, and a bolt through both of said shelves and adapted to clamp the same to said vibrator endwise and contacting said vibrator to retain the same in position crosswise and against said abutment faces.

8. A leg for a hook mechanism of the character described including, a trunk provided with shelves, a vibrator between said shelves, a percussion plate in each end of said vibrator and resting against said shelves, and a bolt through both of said shelves to clamp the same to said vibrator endwise.

9. A hook mechanism of the character described comprising, a flexible means for engaging a crane-hook, legs flexibly attached to said flexible means, and a vibrator mounted in said legs.

10. A hook mechanism of the character described comprising, a flexible means for engaging a crane-hook, legs flexibly attached to said flexible means and composed of a trunk, a vibrator mounted in said trunk, and a removable hook-end suspended from said trunk.

11. A hook mechanism of the character described comprising, a flexible and adjustable means for engaging a crane-hook, legs flexibly attached to said flexible and adjustable means and composed of a trunk, a vibrator mounted in said trunk, and a removable hook-end suspended from said trunk.

12. A hook mechanism of the character described comprising, legs each composed of a trunk provided with shelves, a vibrator mounted between said shelves, a bolt through said shelves and adapted to hold said vibrator endwise and sidewise and crosswise, a hook-end suspended from said trunk, and a flexible crane-hook mechanism flexibly connected to said legs.

JOHN T. STONEY.